Feb. 21, 1956 F. H. MUELLER 2,735,116
COMBINED DRILL AND TAP
Filed April 27, 1953 2 Sheets-Sheet 1
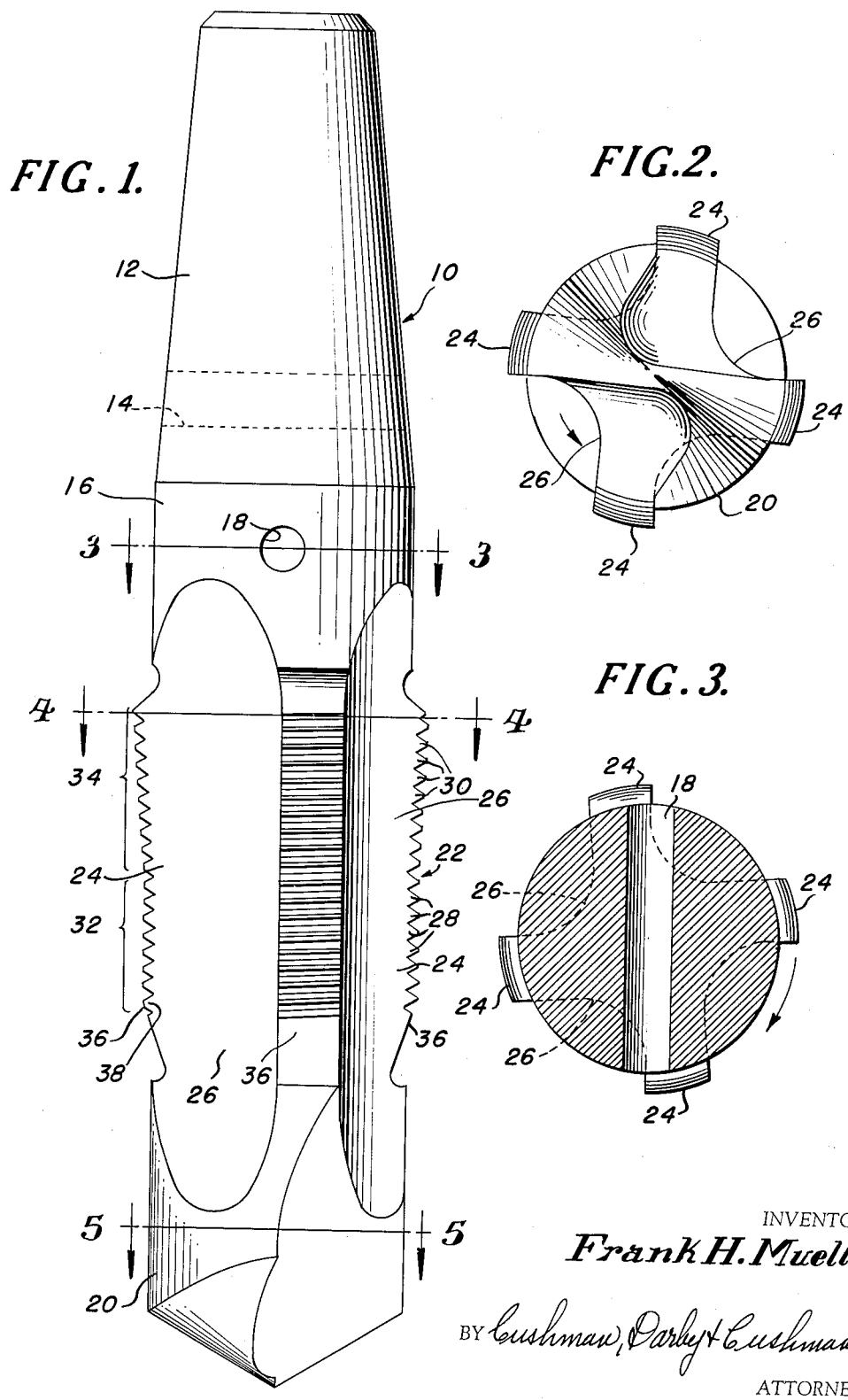
INVENTOR
*Frank H. Mueller*
BY *Cushman, Darby & Cushman*
ATTORNEYS.

Feb. 21, 1956 F. H. MUELLER 2,735,116
COMBINED DRILL AND TAP
Filed April 27, 1953 2 Sheets-Sheet 2

INVENTOR
*Frank H Mueller*

BY *Cushman, Darby & Cushman*
ATTORNEYS

United States Patent Office 2,735,116
Patented Feb. 21, 1956

2,735,116

COMBINED DRILL AND TAP

Frank H. Mueller, Decatur, Ill., assignor to Mueller Co., Decatur, Ill., a corporation of Illinois Application April 27, 1953, Serial No. 351,119

1 Claim. (Cl. 10—140)

This invention relates to a combined drill and tap, and more particularly to a tool for drilling and tapping a main or pipe line in service by a drilling machine of the type illustrated in the copending application of Mueller et al., Serial No. 272,354.

A combined drill and tap of the type under consideration is used to drill a hole in a pipe line and to thread such hole in one continuous operation. Since the thus-drilled and tapped hole is to be used for the connection of a service T, a corporation stop, or the like, the hole is provided with an iron pipe thread for engagement with a complementary thread on the T, or the like. An iron pipe thread, as is well-known in the art, is a taper thread in order to effect a fluid-tight connection.

Accordingly, the tapping section of a tool of the type under consideration has heretofore been provided with tapered tapping threads, or teeth, throughout the entire length of such tapping section. A tool of this type undergoes severe wear in use, paricularly the forwardmost teeth thereof, but the tapping section of tools of this type presently in use cannot be sharpened because such sharpening would render the tapered tapping section undersized. Further, tools of the type under consideration frequently are used to drill and tap cement-lined mains or pipe lines. Obviously, any cutting teeth of the tapping section of the tool which penetrate into the cement lining are worn and dulled much more severely than those teeth which do not penetrate into such cement lining. Since teeth so damaged cannot be sharpened, the life of the entire tool is unduly shortened.

Additionally, it has been found in actual practice that the forwardmost or lead tapping tooth of a tool of the type under consideration has a tendency to fracture and break off upon complete penetration of the wall of the pipe by the tapping section of the tool. From an extensive study of this phenomenon, it appears that the fracturing of such tooth occurs because the forward side of such tooth is unsupported at the time of its emergence through the wall of the pipe, while the rearward side of the tooth is still undergoing considerable cutting pressure. Additionally, since the wall of a main or a pipe line is curved, the forwardmost tapping tooth may first emerge through the wall of the pipe line at a radius of the hole being tapped extending parallel to the axis of the pipe line. Upon further rotation of the tool, however, such tooth again reengages the metal or wall of the pipe line because of the interior cylindrical concavity of the wall being so tapped. In other wards, when such tooth continues to move laterally of the pipe line, it will reengage the metal of the pipe line wall. This cutting reengagement of the tooth also exerts a fracturing force thereon. Again, a broken-off tapping tooth ruins an entire conventional tool.

Tapered tap threads are, of necessity, relieved on their crests and sides rearwardly of their cutting edges relative to the direction of rotation of the tap. Such relief provides only edge support for a tool which has a tapping section that is tapered throughout its entire length, with a resulting loss of guiding stability.

Accordingly, it is an object of this invention to provide a combined drill and tap of the type under consideration which can be resharpened upon the dulling, or fracturing, of the forwardmost tapping tooth or teeth.

It is another object of this invention to provide a combined drill and tap of the type under consideration in which the tool is supported and guided more effectively during the tapping operation.

It is a further object of this invention to provide a combined drill and tap having a much longer useful work life.

Other objects and advantages of the invention will be apparent from the following description and accompanying drawings, in which:

Figure 1 is a side elevation view of a combined drill and tap embodying this invention.

Figure 2 is an end view of the tool shown in Figure 1, taken from the drilling end thereof.

Figures 3, 4 and 5 are transverse sectional views taken on the corresponding section lines of Figure 1.

Figures 6, 7:
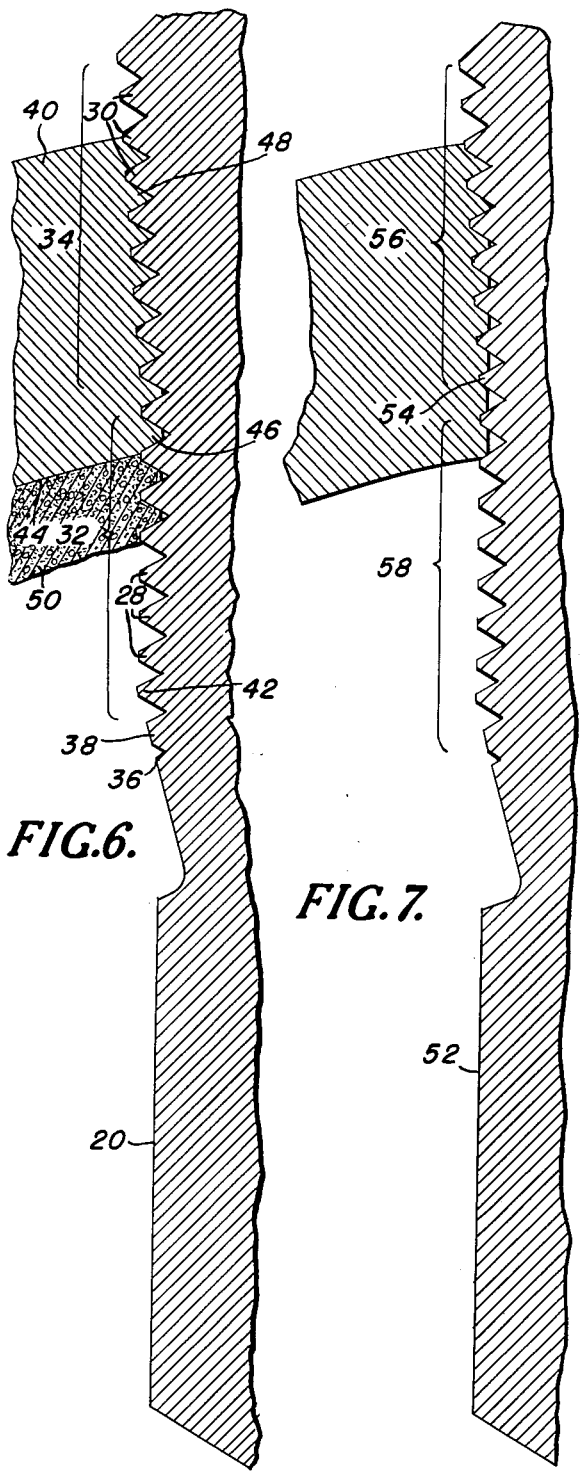
Figure 6 is an enlarged fragmentary longitudnial sectional view of the tool shown in Figure 1 illustratting details of the tapping section.
Figure 7 is a vew corresponding to Figure 6, but illustrating a modification of this invention.
Figure 4:
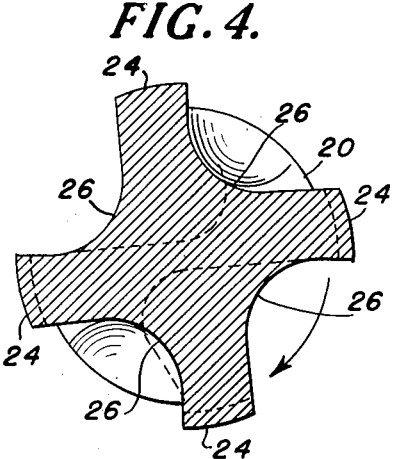
Figure 5:
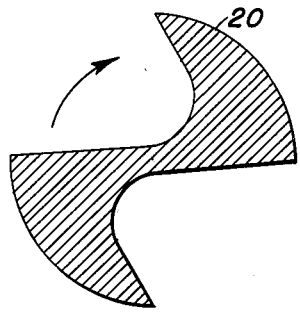

Referring now to the drawings, there is shown therein a combined drill and tap 10 having an elongated tapered shank 12 for reception in the socket of a tool holder (not shown) on the end of a boring bar (not shown). Adjacent the larger end of the tapered shank 12, the tool is provided with a transverse bore 14 for the reception of a locking and driving pin (not shown) adapted to be received in corresponding notches in the rim of the socket on the tool holder. Immediately adjacent the tapered shank 12 of the tool is a short cylindrical section 16 provided with another transverse bore 18 for the reception of a knock-out pin (not shown). These features for locking the tool 10 to a boring bar and for detaching the tool therefrom are described in detail in the aforementioned copending application, so a detailed description thereof is unnecessary here.

The forward end of the tool 10 is provided with a substantially conventional drill section 20 which is followed by a tapping section 22. The tapping section 22 is provided with a plurality, four as shown in the drawings, of uniformly circumferentially-spaced cutter sections or blades 24 having longitudinal flutes 26 therebetween. The cutter sections 24 are provided with two series of tapping threads or teeth 28 and 30 all arranged along the path of a helix for cutting a thread in the side wall of a hole drilled by the drill section 20. Since the tapping threads or teeth of each cutter blade 24 are substantially identical with those of other cutter blades, except that the teeth of each blade are offset longitudinally of the teeth of adjacent blades because of the aforedescribed helical arrangement, a detailed description of the threads or teeth of one blade will suffice.

Each cutter section or blade 24 has a straight forward portion 32 and a tapered rearward portion 34. In other words, the blade 24 has an initial series of teeth or threads 28 of uniform diameter followed by threads 30 of uniform taper. For reasons later described the forward end of the straight tapping portion 32 is chamfered, as at 36 and shown best in Figure 6, to provide a stubby strong leading tooth 38. The diameter of the drill section 20 is intermediate the root and crest diameters of the teeth 28 of the straight tapping portion 32. Preferably, the teeth of both portions 32 and 34 are provided with flattened crests, best shown in Figure 6. The teeth 28 of the straight portion 32 are of uniform longitudinal section throughout their entire circumferential extent. In other words, the straight tapping threads or teeth 28 are not relieved rearwardly of their cutting edges relative to the direction of rotation of the tool 10. The taper threads or tapping teeth 30 of the tapered tapping portion 34 merge smoothly with and constitute an extension of the straight threads or teeth 28 of the forward tapping portion 32. Because of the taper of the cutting threads or teeth 30 of the tapered portion 34, these teeth are, of necessity, relieved both along their crests and along their sides rearwardly of their cutting edges relative to the direction of rotation of the tool. Such relief of the tapered tapping threads or teeth 30 is essential in order to make the tool operative, as is well understood in the art.

In operation of the tool 10, the drill section 20 drills a hole of uniform diameter through the wall of a pipe 40 being operated upon (see Figure 6). The straight tapping portion 32 then enters such hole and the leading strong stubby teeth 38 of this portion effect an initial cut, which cut is deepened by the immediately following unchamfered or full straight threads 42. Further, these immediately following unchamfered straight threads 42 generally true up and clear up the initial cut and make it regular. The remaining straight threads 28 obviously perform no work, i. e., do not cut, but merely follow in the valley of the thread cut by the leading stubby teeth 38 and the immediately following full threads 42. As the tool 10 continues to advance into the work, however, it will be noted that since the straight threads or tapping teeth 28 are unrelieved rearwardly of their cutting edges, the crests and sides of all of the straight teeth are in engagement with the sides of the thread 44 being cut to thereby increase the leading and guiding stability of the tool.

Heretofore tapping tools of this nature have had only tapered tapping threads throughout the entire length of their tapping section, so that inadequate leading and guiding support for the tool was provided by reason of the hereinbefore explained relief of such tapered threads. Obviously, such relief enabled the tool to be supported only at the cutting edges of the teeth and not by the side and crest surfaces thereof.

The tool 10 is continued to be advanced into the work 40 until the forwardmost teeth of the tapered tapping portion 34 penetrate or cut to a point just short of the inner surface 44 of the pipe line. At this point, the tool 10 is reversely rotated and withdrawn from the work. The result is a hole which is provided with a straight thread 46 for an extremely short axial extent at its inner end and with a taper iron pipe thread 48 for the major portion of its axial extent. The axial extent of this taper thread 48 is more than adequate for the secure and fluid-tight engagement thereof by the complementary thread on a service T or the like.

In the event that the pipe 40 is lined with cement 50, it will be seen that the cement will be contacted only by the teeth 28 of the straight tapping portion 32 of the tool 10, so that only the leading straight teeth 38 and 42 will be damaged or dulled by the cement, while the teeth 30 on the tapered tapping portion 34 will be undamaged. Since only the lead threads 38 and 42 of the straight tapping portion 32 become worn, this portion can be resharpened readily by sharpening or grinding the chamfer 36. Further, in the event that a lead thread 38 or 42 of the straight tapping portion 32 is fractured or broken off by reason of strain imparted thereto upon its initial emergence through the wall of a pipe, as heretofore described, the leading end of the straight tapping portion 32 may be rechamfered completely in order to recondition the tool 10. Additionally, it will be noted that the forwardmost or lead threads 30 of the tapered tapping portion 34 do not emerge through the inner wall of a pipe and, accordingly, are not subjected to a fracturing stress.

Referring now to Figure 7 of the drawings, there is shown therein a modification of a tool embodying this invention wherein the diameter of the drill section 52 is substantially greater than the root diameter of the forwardmost or lead tooth or thread 54 on the tapered tapping portion 56, but less than the crest diameter of such thread. Preferably, the diameter of the drill section 52 more nearly approaches the crest diameter of the lead tapered thread 54. By reason of this construction, a hole drilled by the drill section and tapped by the straight tapping portion 58 is of substantially greater diameter than the root diameter of the lead tapered thread 54. Accordingly, this thread 54 never cuts to its full depth and, hence, does not perform as much work as it would were it to cut to its full depth. This construction, obviously, reduces the load on the leading teeth of the tapered tapping portion 56 and minimizes any possibility of damage to or fracturing of such teeth.

It will thus be seen that the objects of this invention have been fully and effectively accomplished. It will be realized, however, that the specific embodiments described for the purpose of illustrating the principles of this invention may be changed without departing from such principles. Therefore, this invention includes all modifications encompassed within the spirit and scope of the following claim:

I claim:

A combined drill and tap for the drilling and tapping of mains or pipes comprising: a leading drilling section; a following tapping section adjacent thereto; a plurality of circumferentially-spaced cutters having flutes therebetween in said tapping section; a series of leading straight tapping threads on each of said cutters with said straight threads being chamfered at the leading end of each of said cutters, said straight threads being otherwise of uniform shape and diameter and being unrelieved on their crests and sides circumferentially rearwardly of their cutting edges; and a series of following tapered tapping threads on each of said cutters merging smoothly with the said straight threads thereon, said tapered threads being of progressively increasing root and crest diameters and being relieved on their crests and sides circumferentially rearwardly of their cutting edges, said straight thread series and said tapered thread series being of generally the same length and said length being generally of the order of the thickness of the wall of the main or pipe to be drilled and tapped, and the maximum diameter of said drill section being greater than the root diameter and less than the maximum crest diameter of said straight threads.

References Cited in the file of this patent
UNITED STATES PATENTS

| | | |
|---|---|---|
| 623,614 | Mueller | Apr. 25, 1899 |
| 832,076 | Oster | Oct. 2, 1906 |
| 1,826,323 | Mueller | Oct. 6, 1931 |
| 1,874,378 | Steinruck | Aug. 30, 1932 |

FOREIGN PATENTS

| | | |
|---|---|---|
| 10,717 | Great Britain | June 23, 1891 |